Feb. 4, 1947.  R. E. OLSON  2,415,304
METHOD AND APPARATUS FOR PASTEURIZING LIQUIDS
Filed Nov. 9, 1944  2 Sheets-Sheet 1
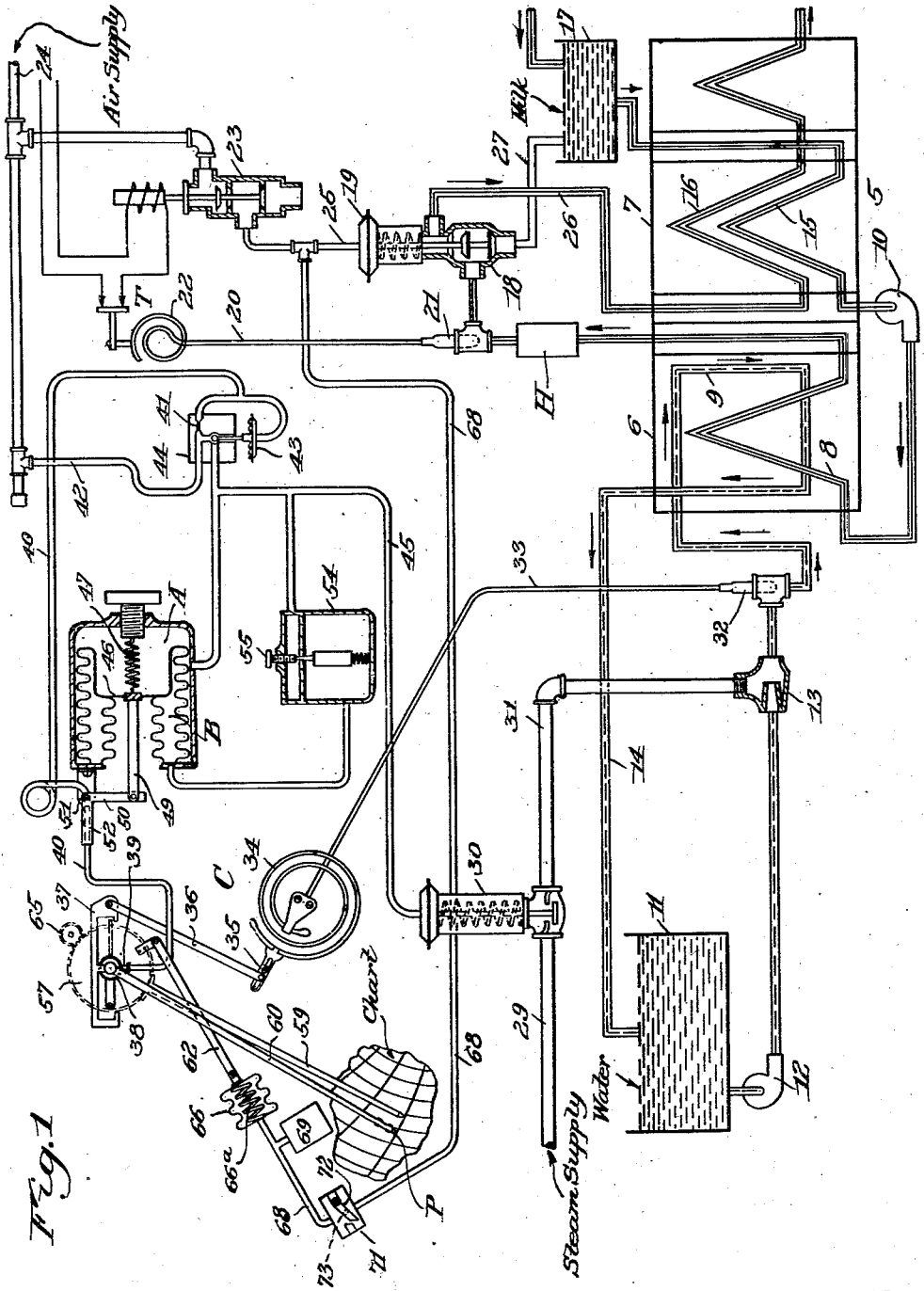
INVENTOR.
Raymond E. Olson
BY D. Clyde Jones
his Attorney Feb. 4, 1947.                R. E. OLSON                2,415,304
            METHOD AND APPARATUS FOR PASTEURIZING LIQUIDS
                  Filed Nov. 9, 1944        2 Sheets-Sheet 2
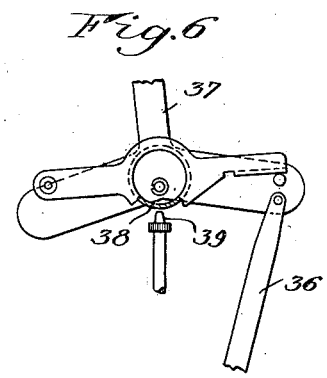
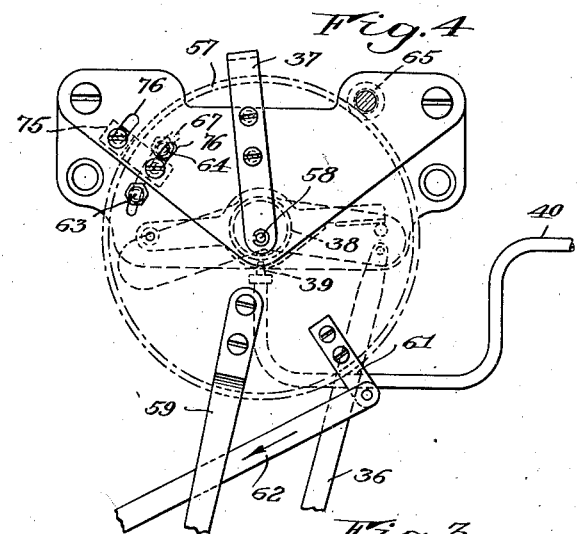
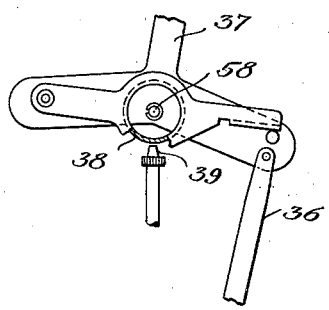
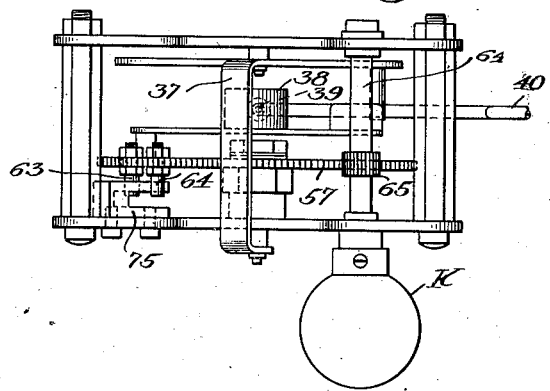
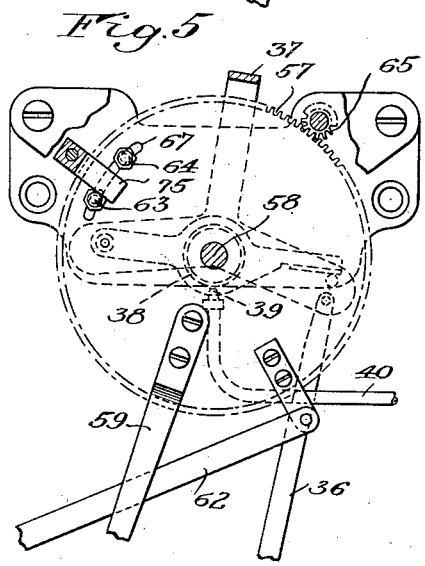
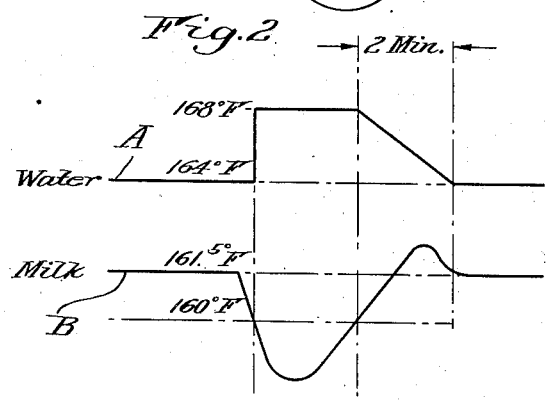
INVENTOR.
Raymond E. Olson
BY
D. Clyde Jones
his Attorney Patented Feb. 4, 1947

2,415,304

UNITED STATES PATENT OFFICE 2,415,304

METHOD AND APPARATUS FOR PASTEURIZING LIQUIDS

Raymond E. Olson, Pittsford, N. Y., assignor to Taylor Instrument Companies, Rochester, N. Y., a corporation of New York Application November 9, 1944, Serial No. 562,663

10 Claims. (Cl. 257—2)

This invention relates to a method of and to apparatus for heating or pasteurizing liquids, such as milk and the like.

In short time pasteurization, the milk or other liquid to be pasteurized, flows in heat exchange relation to a heating medium. This milk, when heated to and held for a specified time at the prescribed temperature, then flows through a so-called flow diversion valve to a discharge outlet. However, the milk, if its temperature is below the prescribed value after pasteurization, is diverted by the flow diversion valve for further pasteurization. It will be understood that the processing of the milk is delayed during such period as the milk is diverted for reprocessing, and therefore it is highly desirable that the period of milk diversion be reduced to the shortest possible time consistent with an acceptable product.

To this end, in applicant's prior Patent No. 2,214,175, granted September 10, 1940, it was proposed to increase the pressure of the steam supplied to the heater of a flow diversion type of pasteurizer during such periods as the milk was diverted, due to the fact that it was underpasteurized. It has been found that the method of milk pasteurization can be improved, if the thermal differential between the heating liquid and the milk, be increased by raising the control point of the heating liquid to a predetermined temperature as soon as the milk is diverted because of under processing.

The main feature of the invention relates to a novel method of pasteurization in which the control point temperature of the heating water is raised above its normal control value, in response to the diversion of the milk, due to under-pasteurization.

Another feature of the invention relates to a novel heating or pasteurizing system wherein the temperature of the heating water is normally maintained at a given control point as long as the milk passing through the heater or pasteurizer is at the prescribed value, but is automatically raised to a new set point temperature in response to the diversion of the milk, for re-processing.

Other features and advantages of the invention will appear from the detailed description and claims when taken with the drawings in which Fig. 1 diagrammatically represents a short time pasteurizing system having the present invention incorporated therein; Fig. 2 is a chart including graphs useful in describing the invention; Fig. 3 is a plan view of the manual and automatic set-point adjustment mechanism of the controller used in the system of Fig. 1, together with a baffle-nozzle combination which cooperates in controlling the temperature of the heating water; Fig. 4 and Fig. 5 illustrate alternative positions of adjustment of the automatic set point adjustment mechanism of Fig. 3; and Figs. 6 and 7 are detail views, showing alternate positions of the baffle with respect to the nozzle, the relative positions of these parts being somewhat exaggerated for purposes of description.

In the drawings, the reference character 5 generally designates a combined pasteurizing unit 6 and a regenerating unit 7. In the pasteurizing unit, the milk or other liquid to be pasteurized, flows through a set of coils or plates 8 in heat exchange relation to a set of heating coils or plates 9 through which there is recirculated, water maintained at a temperature slightly above the pasteurizing temperature. The water recirculating system includes surge tank 11 from which the water is circulated by the pump 12 through a mixing T 13, thence through the heating coils 9 of the pasteurizer and the pipe 14, back to the surge tank.

The regenerator unit includes two sets of coils or plates 15 and 16 in heat exchange relation through one set of which, such as 15, the raw milk from the tank 17 is pumped by the pump 10 to the milk coils or plates 8 of the pasteurizer. The other set of coils or plates 16 of the regenerator conduct the pasteurized milk from the pasteurizer in heat exchange relation to the raw milk in the set of plates or coils 15, thereby serving to cool the pasteurized milk and to partially heat the incoming raw milk. The milk discharged from the pasteurizer coils 8 passes into a suitable holding tube H, where it is held for the required fifteen-second holding interval required in so-called short time pasteurization, and then passes into the flow diversion valve 18.

This flow diversion valve 18, which may be of the general construction disclosed in the Karst Patent No. 2,243,344, granted May 27, 1941, is of the pneumatically-operated type having a diaphragm motor top 19 to actuate the valve stem against the action of a spring to properly position the valve plug.

An electric contact thermometer T, which includes a tube system comprising the sensitive element or bulb 21 communicating with Bourdon spring 22 through capillary 20, controls the flow diversion valve 18. Bulb 21 is positioned in the milk flowing to the inlet of the diversion valve 18. This thermometer is of such construction that when the temperature at the bulb 21 is at or above the predetermined or pasteurizing temperature, the thermosensitive medium in the tube system causes the Bourdon spring 22 of the thermometer to unwind, thereby closing the electrical circuit for operating a solenoid valve 23. This valve, when operated, in turn supplies compressed air from the supply pipe 24 to the conduit 25, and thence to the motor top 19 of the flow diversion valve 18 for moving the same to its forward flow position. With the valve 18 thus opened, the pasteurized milk from the holding tube H, flows through the pipe 26 to the coils or plates 16 of the regenerator unit and thence to a suitable surge tank (not shown), or to a bottling machine (likewise not shown). However, when the milk at the inlet to the diversion valve 18 is below the predetermined pressure, the Bourdon spring 22 of the electric contact controller will wind up to open the above described circuit of the solenoid valve 23. The valve 23 will be closed in this way to cut-off the supply of compressed air and to exhaust the pressure from the conduit 25 leading to the top of the diversion valve. The spring of this diversion valve then operates to move its valve disks so that the improperly pasteurized milk is diverted through the pipe 27 to the milk supply tank 17. From this tank, the improperly pasteurized milk flows again through the pasteurizer unit 6 for further treatment.

It has been mentioned that the milk in the pasteurizer unit 6 is heated by recirculating water maintained at a temperature slightly above the desired pasteurizing temperature. This recirculating water is heated by steam flowing from the supply pipe 29 through the control valve 30 and pipe 31, and thence through the mixing T 13 into the water recirculating system.

A controller, generally designated C throttles the valve 30 included in the steam line, to maintain the temperature of the circulating water at the desired control temperature or set point. This controller includes a tube system comprising a bulb 32 exposed to the temperature of the recirculating water, which bulb communicates through a capillary tube 33 with a Bourdon spring 34, the tube system being filled with a suitable thermosensitive filling medium well known in the art. The Bourdon spring is provided with a take-off arm 35 to which there is connected one end of a link 36. The other end of this link is connected to a rotatable pen arm bracket 37, which moves the baffle 38 with respect to the nozzle 39 to vary the amount of compressed air that escapes through the nozzle and thereby vary the back pressure of the air in the nozzle. It will be understood that the compressed air is normally supplied to the nozzle through the conduit 40, restriction 41 and conduit 42, from the compressed air supply 24. If the temperature of the water at the bulb 32 is below the desired temperature value, the Bourdon spring 34 will tend to wind up. This movement of the Bourdon spring acts through the link 36 to move the baffle 38 slightly away from the nozzle. The back pressure in the nozzle 39 and the conduit 40 decreases, thereby contracting the capsular diaphragm 43 of the relay valve 44. This opens the relay valve to increase the amount of compressed air supplied from the pipe 24 through the conduit 42, relay valve 44 and conduit 45, to the motor top of the control valve 30. This increased pressure in the motor top, opens the valve 30 to supply steam in amounts necessary to maintain the temperature of the recirculating water at the set point or control temperature.

The present controller is preferably of the type known in the art as providing proportional plus proportional speed floating control, which type of controller is especially effective in compensating for load changes, thereby providing highly accurate temperature control. Structurally the controller may be similar to that disclosed in the patent to Tate, Vogt and Clarridge, No. 2,361,885, granted October 31, 1944. However, that controller is herein schematically illustrated and comprises a bellows having a chamber A opposed by a chamber B so that the wall 46 of this bellows is normally maintained in a given position by the coil spring 47 when the pressures in the chambers A and B are equal. The bellows wall 46 has one end of a rod 49 rigidly connected thereto. The other end of this rod is pivotally connected to one arm 50 of a bell crank lever which is mounted on a fixed pivot 51. The other arm 52 of the lever supports the flexible portion of the conduit 40 which terminates in the nozzle 39. It will be noted that the chamber A communicates directly with the conduit 45, while the chamber B communicates with conduit 45 through the capacity 54 and the adjustable needle valve 55. This arrangement is such that on an increase in air pressure in conduit 45, the chamber A expands promptly thereby moving rod 49 to the left. Rod 49 acts on the bell crank lever to move the nozzle slightly toward the baffle, thereby tending to reduce the amount of opening of the valve 30 as called for by the mentioned movement of the baffle 38. However, the air pressure is applied to chamber B from conduit 45 through the needle valve 55 and capacity 54. As the pressure in chamber B builds up, it opposes and eventually substantially cancels the action of chamber A, causing the rod 49 to move toward the right and, in turn, causing the nozzle 39 to slightly recede from the baffle 38. Thus the valve 30 will eventually be opened to a new position as called for by the mentioned opening of the baffle, and this action allows the temperature to return to the original set point while still maintaining a new valve position. If the temperature of the recirculating water is above the control point, this condition will be sensed by the bulb 32 and the controller C will operate in the same manner as just described but in the reverse sense, to close the valve 30 an amount or amounts sufficient to bring the temperature of the recirculating water back to the control point.

The controller C, illustrated in Fig. 1 as a combined recorder and controller, includes mechanism for adjusting the control or set point temperature, that is, the temperature at which the controller is to maintain the temperature of the recirculating water. This adjustment mechanism includes a gear 57 rotatable on the axis 58 about which the pen arm bracket 37 also rotates. The gear carries a set pointer 59, the lower end of which swings over the clock-driven recorder chart (Fig. 1). It will be understood that the pen arm 60 which is carried by the pen arm bracket, terminates in pen P which records on the chart the temperature prevailing at the bulb 32. A pinion 65 which meshes with the gear 57, is mounted on a shaft 64. This shaft terminates in a manual knob K. It will be understood that by turning knob K, pinion 65 rotates the gear 57 to swing the lower end of the set pointer 59 to the desired temperature graduation on the chart, which corresponds to the normal desired temperature of the recirculating water.

In accordance with the method of the present invention, provision is made to raise the set point of the controller automatically whenever the diversion valve 18 moves to its diverting position, due to the fact that the milk has not been heated to the required temperature. In order to effect this result, the gear 57 is provided with a bracket 61 to which one end of the link 62 is pivotally connected. This gear carries spaced pins 63 and 64 adjustably mounted in an arcuate slot 67 in the gear. A stop 75, adjustably mounted in the slot 76 in the frame, engages pins 63 and 64, respectively, to limit the rotation in either direction of gear 57. The other end of the link 62 is pivotally attached to the movable end of a bellows 66. The bellows contains a coil spring 66a having its respective ends attached to the ends of the bellows 66 to insure that the bellows in its contracted position rotates gear 57 until its pin 63 engages the adjustable bracket or stop 75. The interior of the bellows communicates with a conduit 68, to which there is connected a capacity or air chamber 69. Conduit 68, which has the check valve 71 connected therein, communicates with the conduit 25. Valve 71 is of the flapper type wherein the disc-like flapper 72 with its small vent 73, permits air to exhaust quickly from the bellows 66. However, with the application of compressed air in the reverse direction, the flapper 72 closes so that this air is supplied to the bellows 66 only through the small vent 73. The capacity 69 further delays the application of compressed air to the interior of the bellows 66. Thus bellows 66 can contract promptly to raise the set point temperature abruptly, but expands slowly to restore the normal set point temperature gradually.

In the operation of the system let it be assumed that the required pasteurizing temperature of the milk is 161.5° F. In order to maintain this milk temperature, let it be assumed that the recirculating water must be held at 164° F. The normal operation of the controller C tends to maintain this water temperature. With the milk at the required temperature, the tube system of the electric thermometer including the bulb 21, closes the circuit of the solenoid valve 23 to maintain this valve open. Valve 23 applies compressed air to the motor 19 of the flow diversion valve 18, thereby holding this valve 18 in its forward milk flow position. Valve 23 also supplies compressed air through the vent 73 in the flapper valve 71, to the capacity 69 and bellows 66 as well. This air pressure expands the bellows 66 which operates through link 62 to hold the gear 57 in its set point position of 164° F. If, however, the temperature of the milk at bulb 32 drops to 160° F., the electric thermometer T opens the actuating circuit of the solenoid valve 23, causing this valve to shut off the air supply from pipe 24 and at the same time to vent conduits 68 and 25 to the atmosphere. This causes the flow diversion valve 18 to divert the milk. Also, bellows 66 contracts promptly due to the opening of flapper 72, thereby changing the set point of the controller C to a new value such as 168° F.

In the present pasteurizing system, the controller C functions as a proportional plus proportional speed floating controller and under stable conditions controls the water temperature at 164° F., as shown in the first part of graph A in Fig. 2, with the result that the milk temperature is 161.5° F., as shown in the first part of graph B. With a drastic change in load, such as a large sudden change in the temperature of the incoming milk or a substantial drop in steam pressure, the temperature of the milk at bulb 21 of the electric contact thermometer will drop as indicated by the center portion of graph B. As soon as the temperature of the milk at bulb 21 drops to 160° F., the electric contact thermometer opens the operating circuit of solenoid valve 23. The valve 23 shuts off the compressed air supply from conduits 25 and 68 and vents these conduits to the atmosphere. This operates the flow diversion valve 18 to its diverting position. As a result of the venting of the conduit 68, bellows 66 contracts quickly to change the set point of the controller to 168° F., as shown in the center portion of graph A. When the milk temperature at bulb 21 returns to 160° F., the electric thermometer T completes the circuit for opening the solenoid valve 23. Valve 23 again supplies compressed air through conduit 25 to the motor top 19. Motor 19 operates the flow diversion valve 19 to its forward flow position. The solenoid valve 23 also supplies compressed air to the conduit 68. However, under this condition, the flapper 72 of the valve 71 is closed so that the air pressure is applied slowly through the vent 73 in the flapper. The application of compressed air to the bellows 66 is further delayed by capacity 69. Thus the vent 73 and the capacity 69 delay the complete expansion of the bellows 66 for a two-minute period in the example given. It will be understood that by changing the size of the vent 73 and/or the size of the capacity 69, the duration of the mentioned period can be changed at will. During the time that the bellows 66 is expanding, represented as a two-minute period in graph A, this bellows moves the link 62 gradually toward the right. The link 62, in turn, rotates the gear 57 and its set pointer 59 gradually to its original set point temperature of 164° F. for controlling the heating water at that temperature. The gear 57 rotates in the mentioned direction until its pin 64 engages bracket 75. Bracket or stop 75 is adjustably mounted in the arcuate slot 76 in the frame. This mounting of stop 75 is necessary so that it can be loosened and can move freely in the mentioned slot, whereby the gear 57 can be rotated by the knob K and pinion 65 during manual set-point adjustment. After such manual set point adjustment which takes place only on rare occasions, the stop 75 is moved to the proper position in arcuate slot 76 in the frame so that this stop can engage the pins 63 and 64 at the respective temperature control points.

The superior operation resulting from the present invention will be understood from the following facts. During such time as the system is operating in its forward flow condition, the pasteurized milk flows through the regenerator unit 7 in heat exchange relation to the incoming milk being introduced into the pasteurizing unit 6. Under this condition the regenerator unit 7 can preheat or regenerate the incoming milk to 120° F. so that the pasteurizing unit need supply only sufficient additional heat units to raise the milk temperature from 120° F. to 161.5° F. With a given unit 6, the desired rate of heat transfer of such additional heat units may be effected with a heating water temperature of 164° F. However, when the system is in its flow diversion condition, the insufficiently pasteurized milk from the pasteurizing unit 6, flows directly into tank 17 without passing through the regenerator unit 7. Consequently the incoming milk absorbs no heat in the unit 7 and therefore the temperature of the milk reaching the pasteurizing unit 6 may be of the order of 70° F. Thus more heat must be introduced into unit 6 to heat the milk therein to the pasteurizing temperature of 161.5° F. In conventional pasteurizing systems, where the rate of heat transfer is limited by having the heating water temperature always maintained substantially at 164° F., there is an excessive delay in raising the temperature of the milk in the pasteurizing unit 6 to the prescribed value of 161.5° F. However, in accordance with the present invention, the temperature of the water is raised to a higher temperature, for example 168° F., as a result of milk flow diversion, so that the heat transfer rate is increased to compensate for the higher load, thereby shortening the period of milk diversion.

Furthermore, in accordance with the present invention, the heating water temperature is not reduced to 164° F. immediately on the reestablishment of forward milk flow. The immediate restoration of the heating water to 164° F. offers the possibility of causing another milk flow diversion with its consequent loss of regeneration or preheating in unit 7. This possibility can arise due to the flow of steam being abruptly decreased by the controller when its set point is lowered quickly from 168° F. to 164° F. Therefore in accordance with the present invention the restoration of the water temperature to 164° F., is effected at a gradual rate to insure that at no time during the restoration period will the heat input to the pasteurizing unit 6 be less than that required to keep the milk discharged from this pasteurizing unit at or above 161.5° F. With such delayed restoration several successive diversions of short duration can be avoided.

By raising the water temperature as described above, the overall performance of the pasteurizing system is improved because the milk is heated to a higher temperature than normal for a short time. This prevents subsequent repeated diversions of the milk and enables the system to be restored to normal operation in a much shorter period of time. This also eliminates the undesirable effects of frequent and prolonged periods of milk diversion.

What I claim is:

1. The method of effecting quick heating of a liquid which comprises normally maintaining a heating fluid at a predetermined temperature, passing said heating fluid in heat exchange relation to the liquid to be heated to a prescribed temperature, causing said liquid as long as its temperature is at the prescribed value to flow through a discharging passage, causing said liquid to be diverted to a recirculating heat exchange passage as long as its temperature remains below said prescribed value, and raising the temperature of the heating fluid to a value higher than said predetermined temperature, in response to said diversion, and restoring the predetermined temperature of said heating fluid approximately as soon as the liquid to be heated reaches its prescribed value.

2. The method of effecting quick pasteurization of a liquid which comprises normally maintaining a heating fluid at a predetermined temperature, passing said heating fluid in heat exchange relation to the liquid to be heated to a prescribed pasteurizing temperature, causing said liquid as long as its temperature is at the prescribed value to flow through a discharging passage, causing said liquid to be diverted to a recirculating heat exchange passage as long as its temperature remains below said prescribed value, and abruptly raising the temperature of the heating fluid to a value higher than said predetermined temperature, in response to said diversion, and restoring the predetermined temperature of said heating fluid approximately as soon as the liquid to be heated reaches its prescribed value.

3. The method of effecting quick pasteurization of a liquid which comprises normally maintaining a heating fluid at a predetermined temperature, passing said heating fluid in heat exchange relation to the liquid to be heated to a prescribed pasteurizing temperature, causing said liquid as long as its temperature is at the prescribed value to flow through a discharging passage, causing said liquid to be diverted to a recirculating heat exchange passage as long as its temperature remains below said prescribed value, and abruptly raising the temperature of the heating fluid to a value higher than said predetermined temperature, in response to said diversion, and gradually restoring the predetermined temperature of said heating fluid until the liquid to be heated reaches its prescribed value.

4. The method of effecting quick pasteurization of a liquid which comprises normally maintaining a heating fluid at a predetermined temperature, passing said heating fluid in heat exchange relation to the liquid to be heated to a prescribed pasteurizing temperature, causing said liquid as long as its temperature is at the prescribed value to flow through a discharging passage, causing said liquid to be diverted to a recirculating heat exchange passage as long as its temperature remains below said prescribed value, and promptly increasing the thermal differential between the temperature of the heating fluid and the prescribed temperature of the liquid, in response to said diversion, and gradually reducing said thermal differential as soon as said liquid approaches its prescribed temperature.

5. The method of effecting quick pasteurization of a liquid which comprises normally maintaining a heating fluid at a predetermined temperature, passing said heating fluid in heat exchange relation to the liquid to be heated to a prescribed pasteurizing temperature, causing said liquid as long as its temperature is at the prescribed value to flow through a discharging passage, causing said liquid to be diverted to a recirculating heat exchange passage as long as its temperature remains below said prescribed value, increasing the thermal differential between the temperature of the heating fluid and the prescribed temperature of the liquid, in response to said diversion, and gradually reducing said thermal differential as soon as said liquid approaches its prescribed temperature.

6. In apparatus of the class described, a heat exchanger including a first passage for a liquid to be heated and a second passage in heat exchange relation thereto for a heating medium, a circulating system including said last-mentioned passage, a heat source, means including an adjustable temperature controller responsive to the temperature of said medium for introducing heat therein from said source in amounts sufficient to maintain said medium substantially at a given temperature, means including a flow diversion valve movable to one position for discharging liquid from said first passage and movable to another position for diverting said liquid to flow again through said passage, mechanism responsive to a specified temperature of the heated liquid for adjusting said flow diversion valve to its diverting position, means including at least a portion of said mechanism for adjusting said temperature controller, also responsive to said specified temperature of said heated liquid, to maintain said medium at a temperature higher than said given value.

7. In apparatus of the class described, a heat exchanger including a first passage for a liquid to be heated and a second passage in heat exchange relation thereto for a heating medium, a circulating system including said last-mentioned passage, a heat source, means including a temperature controller responsive to the temperature of said medium for introducing heat therein from said source in amounts sufficient to maintain said medium at a given temperature value, an adjustable set point mechanism associated with said controller for changing the value of the maintained temperature of said medium, means including a flow diversion valve movable to one position for discharging liquid from said first passage and movable to another position for diverting said liquid to flow again through said passage, and means responsive to a specified temperature of the heated liquid for moving said flow diversion valve to its diverting position and for adjusting said set point mechanism to maintain said medium at a predetermined temperature higher than said given value.

8. In apparatus of the class described, a heat exchanger including a first passage for a liquid to be heated to a prescribed temperature and a second passage in heat exchange relation thereto for a heating medium, a heat circulating system including said last-mentioned passage, a source of heat, a temperature controller responsive to changes in the temperature of the medium for controlling the introduction of heat into the system in amounts sufficient to maintain said medium at substantially a given set point temperature, said controller having pneumatically-operated set point mechanism actuated by the application of compressed air thereto to cause said controller to control at the given set point temperature and actuated responsive to the removal of compressed air therefrom for causing said controller to control at a higher set point temperature, means including a pneumatically-operated flow diversion valve movable to a forward flow position for discharging liquid from said passage and movable to a second position for diverting said liquid to flow again through said first passage, a source of compressed air, and means responsive to the prescribed temperature of the liquid in said first passage for applying compressed air to said flow diversion valve to move it to its forward flow position and for supplying compressed air to said pneumatically-operated set point mechanism whereby said mechanism is adjusted to said given set point temperature, said means being responsive to a temperature lower than said prescribed temperature for shutting off the supply of compressed air to said flow diversion valve and to the set point mechanism whereby said valve is moved to its diverting position and the set point mechanism is adjusted to control at a higher temperature than said prescribed temperature.

9. In apparatus of the class described, a heat exchanger including a first passage for a liquid to be heated to a prescribed temperature and a second passage in heat exchange relation thereto for a heating medium, a heat circulating system including said last-mentioned passage, a source of heat, a temperature controller responsive to changes in the temperature of the medium for controlling the introduction of heat into the system in amounts sufficient to maintain said medium at substantially a given set point temperature, said controller having pneumatically-operated set point mechanism actuated by the application of compressed air thereto to cause said controller to control at the given set point temperature and actuated responsive to the removal of compressed air therefrom for causing said controller to control at a higher set point temperature, a pipe through which compressed air is supplied to and is vented from said mechanism, means connected to said pipe for delaying the passage of compressed air at least in one direction therethrough, means including a pneumatically-operated flow diversion valve movable to a forward flow position for discharging liquid from said passage and movable to a second position for diverting said liquid to flow again through said first passage, a source of compressed air, and means responsive to the prescribed temperature of the liquid in said first passage for applying compressed air to said flow diversion valve to move it to its forward flow position and for supplying compressed air to the pipe communicating with said pneumatically-operated set point mechanism whereby said mechanism is adjusted to said given set point temperature and responsive to a temperature lower than said prescribed temperature for shutting off the supply of compressed air to said flow diversion valve and to the pipe communicating with the set point mechanism whereby said valve is moved to its diverting position and the set point mechanism adjusted to control at a higher temperature than said prescribed temperature.

10. In apparatus of the class described, a heat exchanger including a first passage for a liquid to be heated to a prescribed temperature and a second passage in heat exchange relation thereto for a heating medium, a heat circulating system including said last-mentioned passage, a source of heat, a temperature controller responsive to changes in the temperature of the medium for controlling the introduction of heat into the system in amounts sufficient to maintain said medium at substantially a given set point temperature, said controller having pneumatically-operated set point mechanism actuated by the application of compressed air thereto to cause said controller to control at the given set point temperature and actuated responsive to the removal of compressed air therefrom for causing said controller to control at a higher set point temperature, a conduit through which compressed air is supplied to and is vented from said mechanism, means including a check valve connected in said conduit and a capacity connected thereto whereby compressed air is promptly vented from said mechanism and is slowly supplied thereto, means including a pneumatically-operated flow diversion valve movable to a forward flow position for discharging liquid from said passage and movable to a second position for diverting said liquid to flow again through said first passage, a source of compressed air, and means responsive to the prescribed temperature of the liquid in said first passage for applying compressed air to said flow diversion valve to move it to its forward flow position and for supplying compressed air to the conduit communicating with said pneumatically-operated set point mechanism whereby said mechanism is adjusted to said given set point temperature and responsive to a temperature lower than said prescribed temperature for shutting off the supply of compressed air to said flow diversion valve and to the conduit communicating with the set point mechanism whereby said valve is moved to its diverting position and the set point mechanism adjusted to control at a higher temperature than said prescribed temperature.

RAYMOND E. OLSON.

REFERENCES CITED

The following references are of record in the file of this patent:

UNITED STATES PATENTS

| Number | Name | Date |
| --- | --- | --- |
| 2,214,175 | Olson | Sept. 10, 1940 |
| 2,302,469 | Patterson | Nov. 17, 1942 |